3,099,649
PROCESS FOR REFINING OF VEGETABLE PROTEIN

Yurio Kawamura, Tokyo, Teikichi Tamuki, Kawasaki-shi, Kanagawa-ken, Aikichi Nagata and Shiro Terashima, Tokyo, Taizi Matsumoto, Kawasaki-shi, Kanagawa-ken, Shoichi Onishi, Tokyo, Shimpachi Konishi, Kawasaki-shi, Kanagawa-ken, Kenkichi Yoshimura, Totsuka-ku, Yokohama-shi, Kanagawa-ken, Hiroshi Yamamoto, Tokyo, and Sabro Ikawa, Yokohama-shi, Kanagawa-ken, Japan, assignors to Ajinomoto Kabushiki Kaisha, Tokyo, Japan, a corporation of Japan
No Drawing. Filed June 28, 1960, Ser. No. 39,231
10 Claims. (Cl. 260—123.5)

The present invention relates to processes for refining vegetable protein, and more particularly to processes for obtaining refined vegetable protein by extracting impurities from oil-free vegetable seeds with water in the presence of a cation exchange resin.

It is well known that various vegetable seeds such as, for example, soybeans, peanuts, cotton seeds, rape-seeds, sesame seeds, kapok seeds, safflower seeds and the like, contain much oil and protein. It is also known that the oil can be extracted and recovered from such seeds by a compressor or by extraction with organic solvents.

Oil-free vegetable seeds, from which the oil has been recovered as described above, contain substantial amounts of protein. They are used as proteinous raw material in the chemical industry, the food industry and in various other fields such as, for example, in the manufacturing of monosodium glutamate. However, oil-free vegetable seeds contain various impurities such as ash and carbohydrates along with the protein, and it is very often desirable to remove these impurities as completely as possible to make the purity of protein sufficiently high before its use as proteinous raw material.

Several proposals have already been made for refining the protein of oil-free vegetable seeds. Among them, the process most generally employed is a solid-liquid extraction system wherein impurities are extracted and removed by using a proper medium such as a diluted mineral acid or a water and lower alcohol mixture. However, when diluted mineral acid is used as the extracting medium, a substantial amount of protein is dissolved and lost in the medium thereby lowering the yield although the refined protein is of relatively high purity. On the other hand, when a water and lower alcohol mixture is used, the loss of protein due to dissolution in the extracting medium is relatively low but the removal of impurities is not complete thereby lowering the degree of purity of the recovered protein. Moreover, the recovery of the lower alcohol requires a very complicated procedure. In short, these methods are not satisfactory from the industrial and practical viewpoint for attaining fully the purpose of refining the protein of oil-free vegetable seeds.

The object of the present invention is to obtain highly refined protein, a valuable material in the various industrial fields, from oil-free vegetable seeds in very high yield by a simple operation.

According to the invention and for providing a simple process for refining protein obtained from oil-free vegetable seeds, said seeds are extracted with water in the presence of a cation exchange resin, whereby water soluble impurities other than protein are extracted and removed to give refined protein of high purity in high yield.

When oil-free vegetable seeds are contacted with water in the presence of a cation exchange resin, water soluble components (carbohydrates, ash, a part of the protein, etc.) of said seeds gradually dissolve into the water but, due to the presence of the cation exchange resin, only cations in the extraction medium are selectively adsorbed by the cation exchange resin to reduce the concentration of the cation component, that is, the ash content in the medium. The decrease of cations causes a lowering of the pH of the extraction medium to the order of 3–4 which is near the isoelectric point of vegetable protein. The solubility of protein becomes extremely low with the lowering of the concentration of ash to minimize the loss of protein due to dissolution into extraction medium.

In the following, the invention will be explained with reference to oil-free soybeans which example is taken as representative of oil-free vegetable seeds.

An extraction vessel was charged with one part of oil-free soybeans and 5 parts of water and then 0.7 part of Diaion SK #1 (H type of the product prepared by Mitsubishi Kasei-Kogyo K.K.) in a bag of synthetic fiber was introduced into the extraction water. The mixture was agitated at room temperature to effect extraction. After 30 minutes, the bag containing Diaion SK #1 was removed from the mixture. The extraction liquid was separated from the oil-free soybeans by centrifuge. The result of this treatment and of conventional processes are set forth for comparison in the following table.

| Treatment | Loss of dissolved protein, percent | Extraction rate of carbo-hydrates, percent | Extraction rate of ash, percent |
|---|---|---|---|
| Present invention | 0.8–1.2 | 45–50 | 80–90 |
| 0.1 N HCl extraction [1] | 4–5 | 45–50 | 50–60 |
| 60% methanol extraction [2] | 2–3 | 35–40 | 20–30 |

[1] Oil-free soybeans 1 part, 0.1 NHCl 5 parts, room temperature, 30 minutes.
[2] Oil-free soybeans 1 part, 60% methanol aqueous solution 5 parts, room temperature, 30 minutes.

As seen in the above table, carbohydrates and ash are very effectively extracted while the loss of protein by dissolution is conspicuously decreased in the treatment of the present invention. Thus it will be well understood that both the purity and the yield of refined protein are greatly improved by the present invention.

Another advantage of the present invention is that inorganic salts and saccharized liquor can respectively be very easily recovered with relatively high purity as by-products. The cation exchange resin used in the extraction liquid and which has adsorbed the cations is treated with mineral acid according to conventional process to elute the adsorbed materials. The eluate is concentrated and cooled to obtain a potassium salt of almost pure condition. The cation exchange resin may be used repeatedly after a washing in water. The extraction liquor separated from oil-free vegetable seeds contains substantially no inorganic salts and very little protein dissolved therein and the major portion of solute is sugars, which amount to 2–3 g./dl. Accordingly said extraction liquor as it is or after concentration may be used as a saccharified liquor (a source of saccharides).

The use of a cation exchange resin in a solid-liquid extraction system is the fundamental characteristic of the present invention as described above. It is believed that the excellent results of the present invention are achieved by the utilization of the special character of the cation exchange resin and is attributable to the use of the solid (oil-free vegetable seeds)-liquid (water)-cation exchange resin system in extraction which is essentially different from the conventional extraction of the solid-liquid-system.

In the present invention, any resin, which can decompose neutral salts and adsorb cations, may be used as the cation exchange resin, and particularly cation exchange resins having a sulfonic acid radical as the functional group. For instance, Amberlite IR–120, Dowex 50, Duolite C–25, Diaion SK #1, and Zeolex SA etc. are suitable. Other cation exchange resins of complex type having a sulfonic acid radical as the main functional group such as, for example, Amberlite XE–111, and cation exchange resins having a phosphoric acid radical as the functional group, such as for example, Duolite C–61, and Permtit XP may also be used.

The amount of cation exchange resin to be used according to the present invention is more than 0.3 part (by volume) per 1 part (by weight) of oil-free vegetable seeds and preferably 0.6–0.8 part (by volume) for obtaining the best result. The amount of extraction medium or water is most adequate at 4–7 parts (by volume) per 1 part (by weight) of oil-free vegetable seeds. However, these amounts may of course be changed according to necessity.

In extraction, if oil-free vegetable seeds and a cation exchange resin are mixed, the separation from each other will become considerably difficult. Accordingly, precautions should be taken to prevent such mixing. For example, the cation exchange resin is put into a bag of synthetic fiber textile and is soaked in the extraction medium, or two extraction vessels connected with pipes are used and oil-free vegetable seeds are charged into one vessel and cation exchange resin is charged into the other, and the water is circulated between the two vessels. The temperature of treatment at the time of extraction scarcely affects the efficiency of extraction.

The refined protein obtained according to the present invention is of sufficiently high purity for various industrial purposes. However, if it is desired to obtain protein of still higher purity, the protein may be purified by treating the product of the present invention with diluted aqueous alkali solution and then with neutralizing agent. This is the second aspect of the present invention.

When oil-free vegetable seeds are extracted with water in the presence of a cation exchange resin, and the obtained residue after separation from the extraction medium is treated with a diluted aqueous alkali solution, an alkaline protein solution containing substantially no impurities is obtained. The extract then has a neutralizing agent added thereto to adjust the pH to the isoelectric point of the protein thereby to precipitate the protein. The precipitated protein is separated from the liquid to obtain a protein of extremely high purity.

It is a well known method to obtain pure protein by extracting protein from oil-free vegetable seeds with an aqueous alkali solution and adjust the pH of obtained aqueous alkaline protein solution to the isoelectric point of protein by adding acid thereby precipitating protein and then separating precipitated protein. However, the aqueous alkaline protein solution obtained by treatment with an aqueous alkali solution according to the above mentioned conventional method contains fairly great amount of various impurities, since various water soluble materials other than protein such as ash and carbohydrates are also dissolved out into the extraction medium along with the protein. When such liquid is supplied with acid to make it acidic with a view to precipitating protein, it is unavoidable that said impurities are also precipitated along with protein to be admixed in the precipitated protein. Under such conditions, it is natural that the purity of obtained protein is unavoidably lowered.

It is further to be noted that the solubility of protein at the isoelectric point thereof is increased under the influence of the presence of co-existing salts in the extraction medium thereby lowering the yield of precipitated protein. This decrease of the yield can be understood in view of the generally known fact that the solubility of vegetable protein in water is increased when salts are present in water. In short, it is impossible to obtain protein of very high purity in high yield at high efficiency according to the conventional method.

In contrast, in the method of the present invention, the oil-free vegetable seeds to be treated with aqueous alkali solution are those which have been subjected to the treatment with water and cation exchange resin and from which water-soluble impurities such as carbohydrates and ash have have already been removed. Consequently the aqueous alkaline protein solution obtained by the method of the present invention is a solution of protein of high purity and hence protein of extremely high purity can be easily obtained in high yield from said solution.

The present invention is compared with the conventional alkali extraction method with respect to the purity of protein and the rate of loss of protein in the following.

|  | Purity of Protein, (total nitrogen) percent | Loss of Protein, percent |
|---|---|---|
| Present invention | 15–16 | 2.2 |
| Alkali extraction | 14–15 | 6.8 |

In the step of extraction of protein with aqueous diluted alkali solution according to the present invention, there is no specific limitation in regard to the kind, concentration, and amount of alkali to be used. However, it is preferable in general to use a solution of alkali selected from the group consisting of sodium hydroxide, potassium hydroxide, sodium carbonate and potassium carbonate. With regard to the concentration, it is generally preferable to use 0.1–1.0% alkali solution in the amount 5–20 times by volume as much as the oil-free seeds, based on the volume of the latter in dry state, subjected to extraction of impurities with water and cation exchange resin (dry).

The recovery of protein from an aqueous alkaline protein solution obtained by extraction with an alkali solution is effected by adding an acid such as hydrochloric acid, sulfuric acid, citric acid and acetic acid to adjust the pH of the solution to the isoelectric point of protein thereby to precipitate protein. Precipitated protein is separated from the liquid by centrifuge or filtration and dried to give purified protein.

If desired, before the addition of acid, the aqueous alkaline protein solution may be supplied with a cation exchange resin (H type) to neutralize the liquid to a pH of 7.0 and then said pH may be adjusted to the isoelectric point of protein by adding acid.

Pure protein material may also be obtained from the protein solution treated with cation exchange resin to have a pH of 7.0 as described by spray-drying of said solution.

There are some differences in the nature of oil-free seeds depending on the difference of methods used for removal of oil from the seeds; for example, whether compression or extraction is used, whether low temperature treatment or high temperature treatment is used. However, the present invention can be applied to all kinds of oil-removed seeds irrespective of the method used for freeing the oil.

Further, the present application is applicable to all kinds of oil-free vegetable seeds, irrespective of whether they are residues of soybeans, peanuts, cottonseeds, rape seeds, sesame seeds, kapok seeds or safflower seeds after the extraction of oil therefrom.

Further, it is to be noted that the oil-free vegetable seeds may be in any form, such as powder, flake and cake.

Some examples of the application of the present invention are next described.

*Example 1*

1 kg. of oil-free soybeans (total nitrogen 8.08%, carbohydrates 19.70%, ash 5.75%) was charged into an extraction vessel and 5 l. of water were added. A bag of "Saran" (a synthetic fiber textile, with the trade name of Asahi-Dow Co.) containing 600 ml. of cation exchange resin "Zeolex SA" (product of Zeolite Industrial Co., Ltd., H type) were soaked in the extraction water and extraction was conducted at room temperature under agitation. After 2 hours, the bag of Zeolex SA was raised from the extraction medium and then solid material and the extraction liquid were separated.

The solid material (water content 64.2%) amounting to 1970 g. was dried and 705 g. of refined protein (total nitrogen 11.30%) were obtained. The rate of recovery of protein was 98.7%. The filtrate amounting to 3770 ml. had a pH of 3.2 and contained nitrogen in an amount of 0.022 g./dl., carbohydrates in an amount of 2.42 g./dl. and KCl in an amount of 0.018 g./dl. This shows that the dissolution loss of protein was 1.03% and the rate of extraction of carbohydrates was 46.3%. The adsorbate was eluted from the Zeolex SA by 3 N hydrochloric acid and the eluate was concentrated and cooled to recover inorganic salts comprising mainly potassium chloride. The extraction rate of ash was about 82%.

*Example 2*

1 kg. of oil-removed cotton seeds (total nitrogen 7.33%, carbohydrates 22.37%, ash 7.45%) was charged into an extraction vessel. A separate vessel for the cation exchange resin was filled with 600 ml. of Zeolex SA (H type). The two vessels were connected by pipes and 5 l. of water were circulated between the two vessels by a pump to effect extraction. After extracting for one hour, solid material and extraction liquid were separated from each other and the solid material was dried to obtain 690 g. of refined protein (total nitrogen 10.40%). The rate of recovery of protein was 97.8% while the rate of extraction of carbohydrates and that of ash were 49% and 80% respectively. The pH of the extraction liquid was 3.5. When the extraction was effected on oil-free cotton seeds with only water with no use of cation exchange resin, the rate of recovery of protein was only 89.2%.

*Example 3*

An extraction vessel was charged with 1 kg. of oil-free soybeans (total nitrogen 8.13%, carbohydrates 20.3%, ash 5.80%) and supplied with 5 l. of water. A bag of "Saran" containing 600 ml. of Zeolex SA (H type) was immersed into the extraction water and extraction was carried out under agitation at room temperature. After one hour, the bag was raised and solid material and extraction liquid were separated by centrifuge. The extraction rate of carbohydrates of the extraction liquid was 47%, the loss of protein was 1.23%, and the extraction rate of ash was 85%, almost all of them having been adsorbed by the resin and recovered. The solid material amounted to 2.105 g. (water content 66.1%) and the total of nitrogen in dried material was 11.25%.

To this material was added 7550 cc. of 0.35% aqueous solution of caustic soda and after extracting protein for 20 hours at pH 9.0, the mass was filtered. The residue of filtration was dried and 475 g. of dried material (total nitrogen 10.42%) were obtained. The filtrate, an alkaline aqueous solution of protein amounted to 6320 cc. 400 ml. of Zeolex SA (H type) in a bag of "Saran" were agitated in the filtrate to neutralize and desalt it and the pH was directly made 4.5. Precipitated protein was separated by centrifuge and dried to give 193 g. of pure protein (total nitrogen 15.55%). 5470 cc. of waste liquor contained total nitrogen 0.015 g./ml.

Accordingly the loss of protein from oil-removed soybean was 2.24% while the extraction rate of carbohydrates was 60.4%.

*Example 4*

12 l. of 0.22% caustic soda solution were added to 2105 g. of solid material obtained by the step of Example 1, and extraction of protein was carried out at a pH of 10.5 for 20 hours. The solid was separated by filtration and washed with water. There were obtained 304 g. of dried material (total nitrogen 8.10%) and 21 l. of an alkaline aqueous solution of protein. Into the liquor were poured 500 ml. of Diaion SK #1 (H type), the liquor being stirred to adjust the pH to 7. After removing the resin by decantation, the solution was adjusted to a pH of 4.2 by addition of hydrochloric acid. Precipitated protein was separated by centrifuge and dried. 353 g. of pure protein (total nitrogen 15.25%) were obtained. The yield was 66%. The loss of dissolved protein during the operation was 3.8%.

What is claimed is:

1. A method comprising removing impurities from oil-free vegetable seeds by subjecting the seeds to extraction in water in the presence of an H-type cation exchange resin whereby the pH in the extraction liquor formed by the water is lowered to minimize the solubility of protein in said liquor, separating the liquor from the resulting residue, and recovering the protein content of said residue.

2. A method as claimed in claim 1 wherein said resin is of the type having a sulfonic acid radical.

3. A method as claimed in claim 1 wherein said resin is confined to a discrete zone within the body of said liquor and is prevented from dispersing in the latter.

4. A method as claimed in claim 1 wherein said protein content is recovered by subjecting said residue to extraction with an alkali solution and adding an acid thereto to adjust the pH to the isoelectric point of protein to precipitate the latter.

5. A method as claimed in claim 4 wherein the alkali soltuion is a 0.1–1.0% aqueous solution which is employed in an amount of 5–20 times the amount of seeds based on volume.

6. A method as claimed in claim 1 wherein more than .3 part by volume of resin is used for each part by weight of said seeds and 4–7 parts by volume of water is used per part of seeds by weight.

7. A method as claimed in claim 6 wherein extraction is effected at room temperature.

8. A method as claimed in claim 1 wherein said protein content is recovered by subjecting said residue to extraction with an alkali solution, adding an H-type cation-exchange resin to the resulting protein solution to adjust the pH thereof to about 7 and to desalt the solution, and adding an acid to the neutralized and desalted solution to adjust the pH to the isoelectric point of protein to precipitate the latter.

9. A method as claimed in claim 1, wherein said protein content is recovered by subjecting said residue to extraction with an alkali solution, adding an H-type cation-exchange resin to the resulting protein solution to adjust the pH thereof to about 7 and to desalt the solution, and drying the said neutralized and desalted solution to obtain pure dried protein.

10. A method as claimed in claim 1 wherein said protein content is recovered by subjecting said residue to extraction with an alkali solution and adding an H-type cation-exchange resin thereto to adjust the pH to the isoelectric point of protein and to desalt the solution, to precipitate the protein content.

References Cited in the file of this patent

UNITED STATES PATENTS 2,573,072   Vassel _____ Oct. 30, 1951

OTHER REFERENCES

Calmon et al.: "Ion Exchangers in Organic and Biochemistry," Interscience Publishers, Inc., New York, New York (1957), page 592 (1 page).